May 10, 1966 JEAN-PIERRE VASSEUR 3,250,855

ELECTRICAL GENERATORS OF QUASI RANDOM DIGITS

Filed May 23, 1962 6 Sheets-Sheet 1

JEAN-PIERRE VASSEUR
Inventor

ELECTRICAL GENERATORS OF QUASI RANDOM DIGITS

Filed May 23, 1962 6 Sheets-Sheet 2

JEAN-PIERRE VASSEUR
Inventor

May 10, 1966 JEAN-PIERRE VASSEUR 3,250,855

ELECTRICAL GENERATORS OF QUASI RANDOM DIGITS

Filed May 23, 1962 6 Sheets-Sheet 3

JEAN-PIERRE VASSEUR
Inventor

ELECTRICAL GENERATORS OF QUASI RANDOM DIGITS

Filed May 23, 1962 6 Sheets-Sheet 4

JEAN-PIERRE VASSEUR
Inventor

May 10, 1966 JEAN-PIERRE VASSEUR 3,250,855

ELECTRICAL GENERATORS OF QUASI RANDOM DIGITS

Filed May 23, 1962 6 Sheets-Sheet 5

JEAN-PIERRE VASSEUR
Inventor

ELECTRICAL GENERATORS OF QUASI RANDOM DIGITS

Filed May 23, 1962 6 Sheets-Sheet 6

JEAN-PIERRE VASSEUR
Inventor

United States Patent Office 3,250,855

Patented May 10, 1966

3,250,855

ELECTRICAL GENERATORS OF QUASI RANDOM DIGITS

Jean-Pierre Vasseur, Paris, France, assignor to C.S.F.-Compagnie Generale de Telegraphie Sans Fil, a corporation of France Filed May 23, 1962, Ser. No. 197,099

Claims priority, application France May 29, 1961, 863,278; June 7, 1961, 864,106; June 19, 1961, 865,316

18 Claims. (Cl. 178—22)

The present invention relates to cryptographic devices and more particularly to generators of quasi random digits or symbols, for example of the type used as key generators for cryptographic devices and comprising a plurality of binary counters, associated with permutator, decoder and encoder electric circuits. Such generators are arranged for providing at the output thereof quasi random digital symbols by means of comparatively simple circuits.

Generators of this type have been, for example, described in the copending Patent application, Serial No. 127,171, for "Improvements in Electrical Generators of Quasi Random Symbols" filed by the applicant July 27, 1961 and now Patent No. 3,170,033.

In the various embodiments disclosed in this copending patent application, the binary digits generated by counters are arranged in a plurality of groups, each of which is separated decoded, permutated and encoded again, before all the groups are joined together, each of the decoding, permutating and encoding assemblies, operating on one of these digit groups, comprising as many outputs as inputs.

It is an object of the invention to insert at least in some of said decoding, permutating and encoding assemblies, logical sum circuits, i.e. OR-circuits, so as to make the number of outputs of these assemblies smaller than the number of the inputs thereof.

This arrangement increases the cryptographic security, since a given pattern of the outputs of the decoding, permutating and encoding assemblies, thus modified, may thus originate from a great number of different patterns of the corresponding outputs of the counters. Another object of the invention is to improve still further the cryptographic security of the system by assuring that the output signals of the key generator are substantially equiprobable i.e. that there is a substantially equal probability of a signal's occuring at any one of the system outputs.

According to the invention, this is obtained by means of auxiliary counters arranged in such a manner that their respective counts have an equal probability of advancing.

A still further object of the invention is to reduce the number of the key digits. This may be in particular performed by means of a reducer device, which comprises $n$ main inputs to which the count to be reduced is fed, $n$ groups of $m$ AND-gates, each group being coupled to one of said inputs, a count source and $m$ decoders for decoding the count thereof, each decoder having $m$ outputs, one output of each decoder being coupled to one AND-gate input in each AND-gate group and $m$ OR-gates, each having $n$ inputs respectively coupled to one output of one AND-gate in each AND-gate group.

The invention will be best understood from the following description and appended drawings, wherein.

Figure 1:
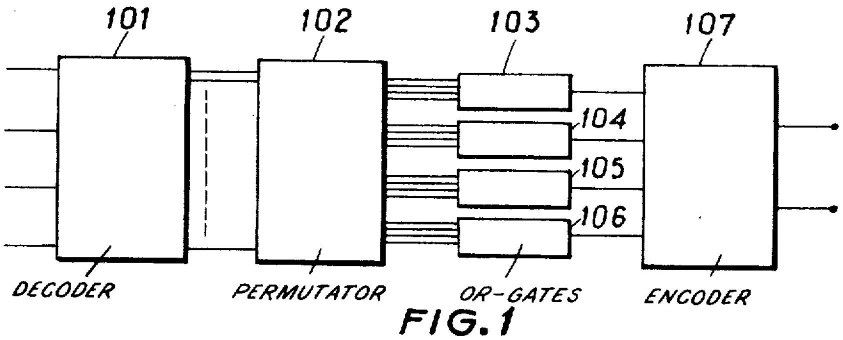
FIG. 1 shows the block diagram of a decoding, permutating and encoding assembly, according to the invention.

The system shown in FIG. 1, comprises a binary decoder 101 having, for example, four binary inputs and sixteen outputs. The sixteen outputs of decoder 101 are connected to a permutator 102 having sixteen inputs and sixteen outputs forming four groups of four outputs. The outputs of each group are respectively connected to the four inputs of the logical OR-circuits or OR-gates 103, 104, 105 and 106, whose outputs are respectively connected to the four inputs of a binary encoder 107 having two outputs.

All the elements of the circuit shown in FIG. 1 are well known in the art and may be the same as those disclosed in the above mentioned copending patent application. However, an essential feature of the circuit of FIG. 1, consists in the provision of the OR-gates 103 to 106. These gates provide a signal at their output, each time a signal occurs at one of their inputs. Accordingly, signals at different inputs of an OR-gate, and consequently different binary numbers at the input of decoder 101, may cause the same binary number to be manifested at the output of encoder 107. The invention thus results in rendering the deciphering operation substantially more complicated.

Figure 2:
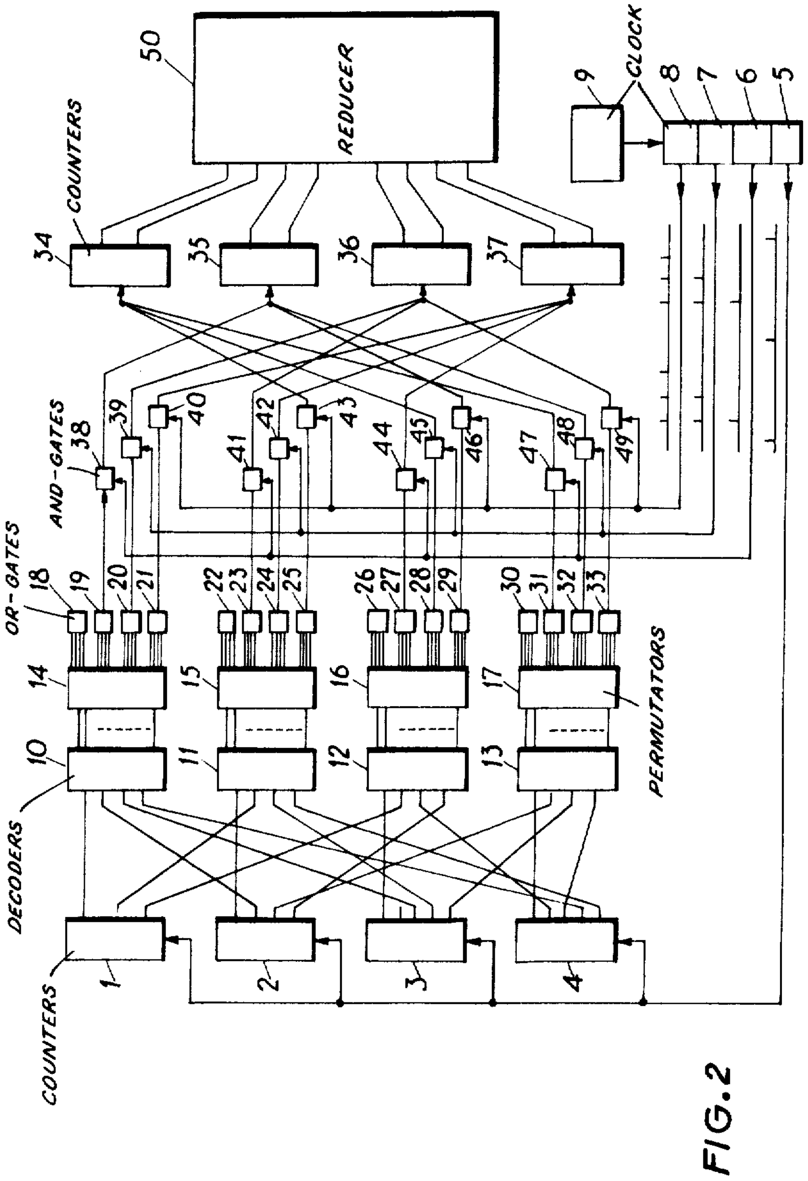
FIG. 2 is a block diagram of another system according to the invention including the auxiliary counters.

The key generator of FIG. 2 comprises four binary counters 1, 2, 3 and 4, the respective maximum counts of which are, for example, 7, 15, 29 and 31.

These four counters are fed by a first section 5 of a clock comprising four sections 5, 6, 7, and 8.

The clock is driven by a synchronizing generator 9 and the part played by each section thereof will become apparent as this specification proceeds. Each clock section has a separate output.

The three outputs of counter 1 are respectively connected to three decoders 10, 11 and 12. The four outputs of counter 2 are respectively connected to four decoders 10, 11, 12 and 13. Four of the outputs of each one of the counters 3 and 4 are respectively connected to the four decoders 10, 11, 12 and 13, while the fifth output of counter 3 is unconnected and the fifth output of counter 4 is connected to decoder 13.

Each decoder 10 to 13 has four binary inputs and sixteen outputs.

The outputs of each decoder are respectively connected to the inputs of one of the permutators 14 through 17, each having sixteen outputs. The outputs of each permutator are arranged in groups of four, each group being connected to the inputs of one of the OR-circuits 18 through 33.

According to a feature of the invention, the outputs of the OR-circuits 18, 22, 26 and 30 are unconnected, while the outputs of the other OR-circuits are respectively connected, for example, to four auxiliary counters 34 through 37, through AND-circuits 38 through 49.

The AND-circuits 38, 41, 44 and 47 have one input connected to the output of section 6 of the clock 9; the AND-circuits 39, 42, 45 and 48 have one input connected to section 7 of the clock 9; the AND-circuits 40, 43, 46 and 49 have one input connected to section 8 of the clock 9.

Between two pulses produced by section 5 of the clock, section 6 produces one pulse, section 7 produces two and section 8 three pulses.

In the embodiment described, the pulses produced by sections 6, 7 and 8 coincide in time, as shown in FIG. 2.

It follows that the occurrence of a signal at the outputs of the OR-circuits 18, 22, 26 and 30 does not result in any advance of the count of the auxiliary counters; that the occurrence of a signal at the outputs of the OR-circuits 19, 23, 27 and 31 results in the advance of the auxiliary counters by one step; that the occurrence of a signal at the outputs of the OR-circuits 20, 24, 28 and 32 causes the auxiliary counters to advance by two steps; and that the occurrence of a signal at the outputs of the OR-circuits 21, 25, 29 and 33 causes the auxiliary counters to advance by three steps.

It may be shown that, due to this arrangement, the $2^8=256$ possible combinations of the outputs of the auxiliary counters 34 to 37 have an equal probability, which is important from the point of view of the cryptographic security.

It may also be shown that each final output of the device shown in FIG. 2 is determined both by the actual and the previous conditions of counters 1 to 4 and by the previous output and that the period of the generator system is generally four times that of the counters.

The outputs of the auxiliary counters 34 to 37 may serve as the outputs of the generator system, or else, as shown in FIG. 2, they may be connected to a unit 50 including four additional decoding, permutating and encoding assemblies or auxiliary counters, which may be followed by a system adapted to reduce the number of the outputs, for example of the type disclosed in the above mentioned copending patent application.

An embodiment of the unit 50 will be described below with particular reference to FIGS. 5 and 6.

It is to be understood that many modifications may be made in the circuits described without departing from the spirit of the invention.

Thus, sections 5 through 8 of the timing clock may be such that their respective first cycles do not coincide in time.

In addition to the equiprobability of having an output signal at any one of the various outputs, it should be desirable to have for each of the auxiliary counters the equiprobability of passing from one given output to any other output.

Figure 3:
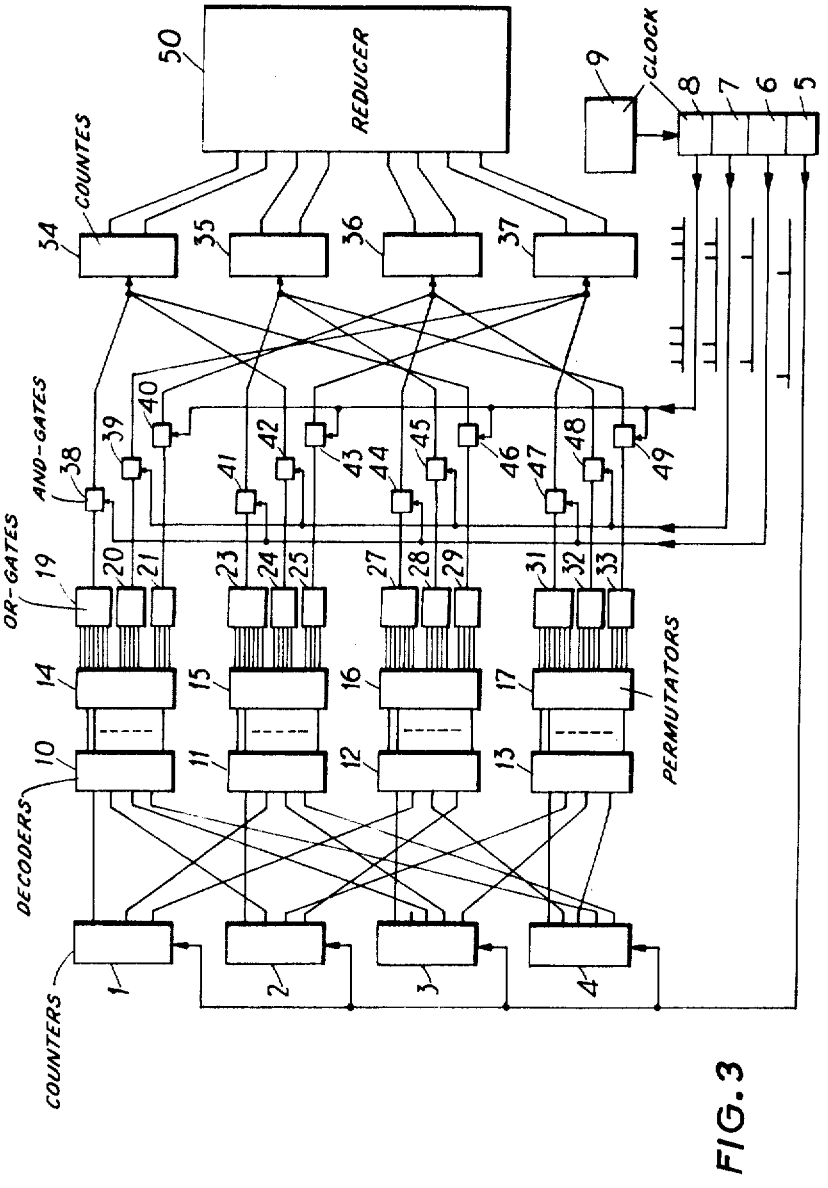
FIGS. 3, 4 and 5 are further alternative embodiments of the system illustrated in FIG. 2.

According to the invention, this last result may be approached in several ways. Thus, the outputs of the permutators may be unequally distributed among the OR-circuits already described, as shown in FIG. 3, wherein the same elements carry the same reference numerals as in FIG. 2.

It will be seen that the sixteen outputs of any one of the permutators, such as permutator 14, instead of being uniformly distributed among the four OR-circuits, such as the OR-circuits 18 to 21 of FIG. 2, are, in FIG. 3 distributed as follows:

OR-circuit 18 (not illustrated), no output.
OR-circuit 19, 7 outputs.
OR-circuit 20, 5 outputs.
OR-circuit 21, 4 outputs.

It may be shown the the unequalled distribution shown, as well as any other type of unequal distribution, will greatly improve the chances of an equal probability of passing from one given output to any other output of counters 34 to 37.

Figure 4:
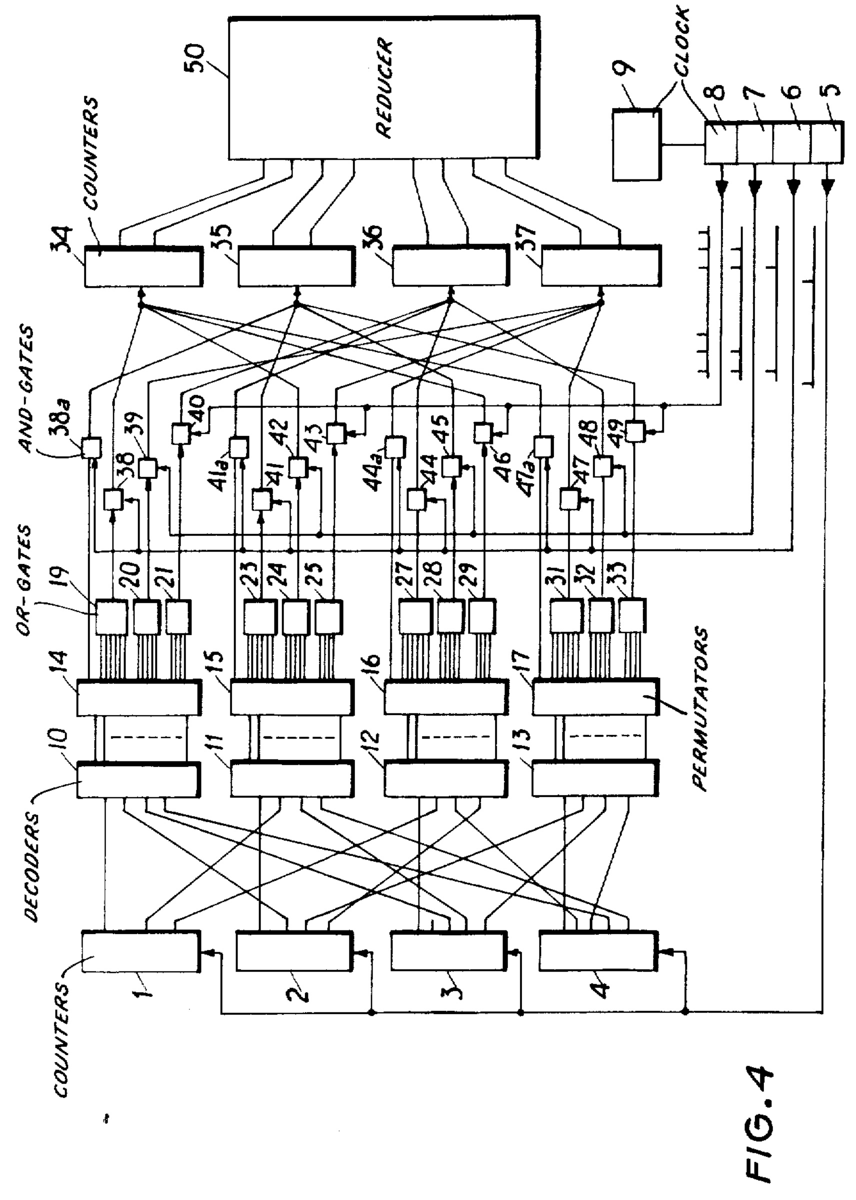

FIG. 4 shows another embodiment of the same type as that of FIG. 3.

Figure 5:
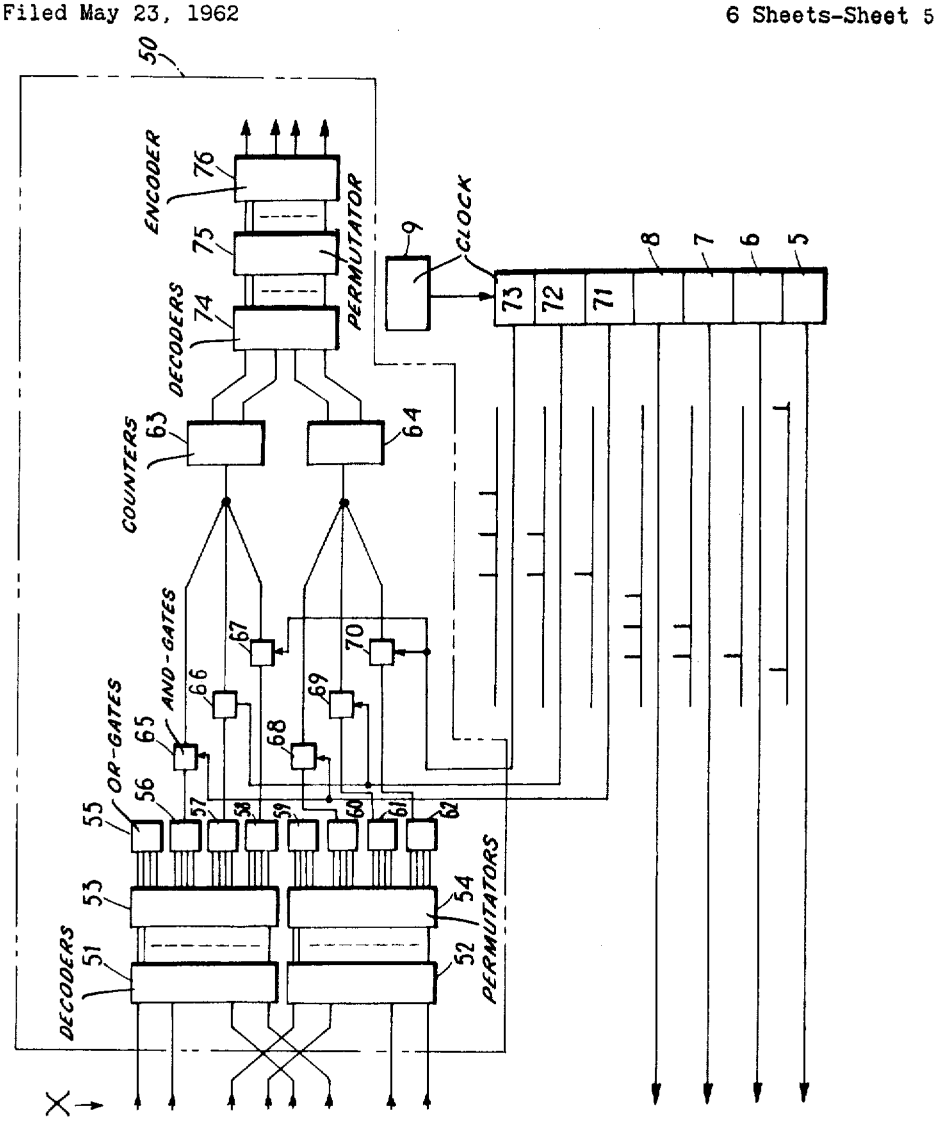

FIG. 5 shows an embodiment of the reducer on terminal block 50 of FIGS. 2 to 4.

This device comprises two decoders 51 and 52, having four inputs and sixteen outputs. The inputs are connected to the eight outputs of counters 34 to 37, as shown.

Decoders 51 and 52 are followed by two permutators 53 and 54, each having sixteen inputs and sixteen outputs, the latter being connected, by group of four, to the OR-circuits 55 through 62.

The outputs of the OR-circuits 55 and 59 are unconnected; the outputs of the OR-circuits 56, 57 and 58 are connected to the input of an auxiliary counter 63, through respective AND-circuits 65 to 67; the outputs of the OR-circuits 60 to 62 are connected to the inputs of an auxiliary counter 64, through respective AND-circuits 68 to 70. The control inputs of the AND-gates 65 and 68 are connected to section 71 of a clock having seven sections 5–6–7–8–71–72–73; the control inputs of the AND-circuits 66, 69 and 67, 70 are respectively connected to sections 72 and 73 of the same clock.

Sections 5 to 8 of the clock are those illustrated in FIG. 2 and are connected in the manner shown. The additional sections 71 to 73 provide pulses which are distributed in time, for example, as shown in FIG. 5.

The auxiliary counters 63 and 64 are connected to a decoder 74, the outputs of which are connected to a permutator 75, which is in turn connected to an encoder 76.

It will be noted that in the circuit of FIG. 5 inputs of the same auxiliary counter are connected to the outputs of the same permutator, whereas, in the device of FIG. 2, they were derived from different permutators. This combination has the advantage of making the advancing of these auxiliary counters more independent of one another. When connected after the circuits shown in FIGS. 2, 3 or 4, this arrangement assures the equal probability of occurrence of the outputs and the combinations of two successive outputs of the key.

Of course the circuit of FIG. 5 is not limited to only two stages of the auxiliary counters connected in series.

Figure 6:
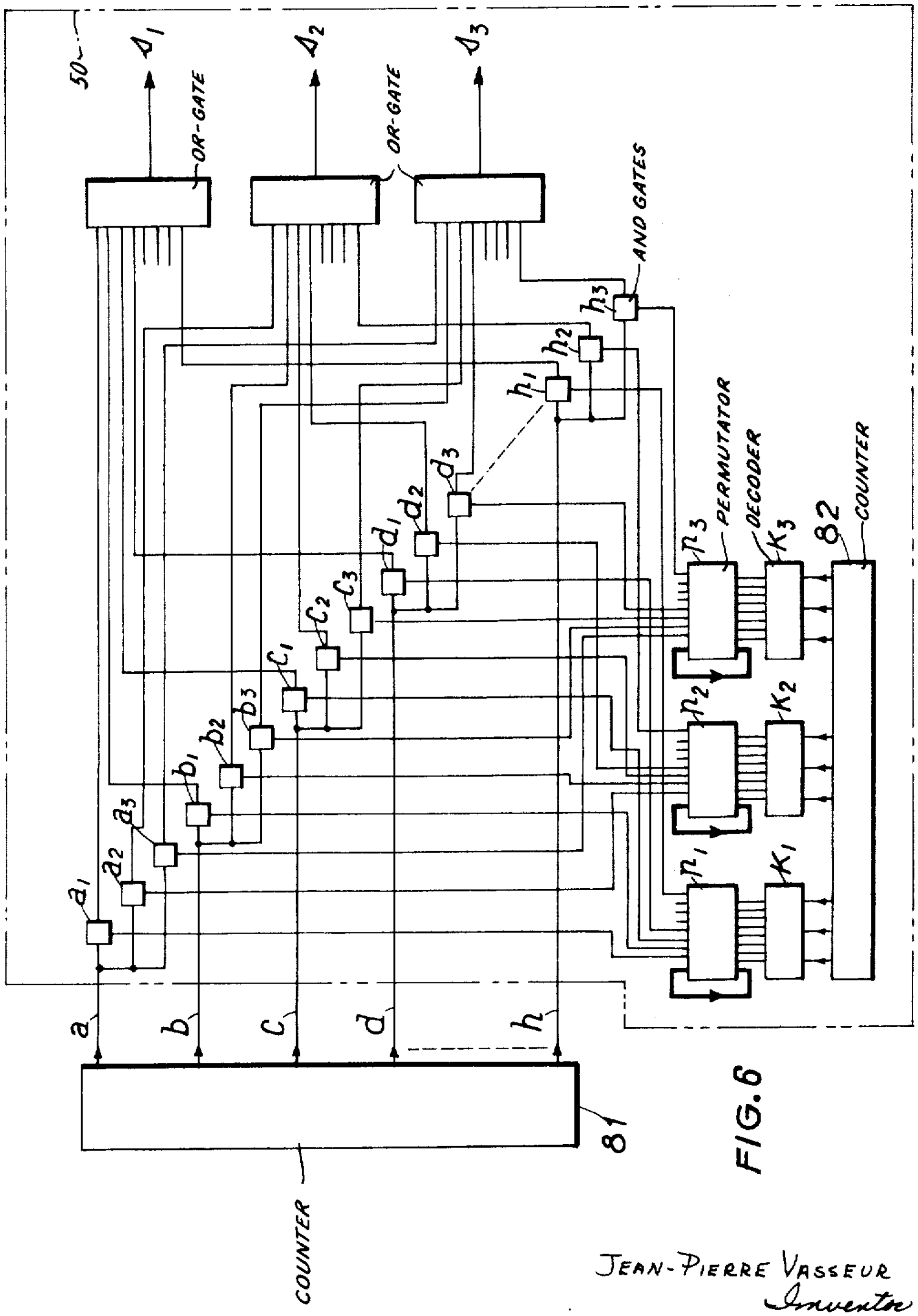
FIG. 6 is a block diagram of a terminal reducer which may be used according to the invention.

The reducer circuit of FIG. 6 is shown with only one key generator 81 having eight outputs *a* to *h*. The circuit also comprises nine auxiliary inputs derived from an auxiliary key generator 82. The latter may have the same structure as key generator 81 or comprise a permutator fed by key generator 81. Each input *a* to *h* is connected in the embodiment shown to three AND-circuits, designated by the same character as the input associated therewith, carrying an index 1, 2 or 3.

The AND-circuits of order 1, i.e. the AND-circuits $a_1b_1 \ldots h_1$, are also connected to a permutator $p_1$; the AND-circuits $a_1$, $b_2 \ldots h_2$ are also connected to the eight outputs of a permutator $p_2$ and the AND-circuits $a_3$, $b_3 \ldots h_3$ are also connected to the eight outputs of a permutator $p_3$.

In the example illustrated, there are shown permutators having sixteen inputs and sixteen outputs and eight outputs of each of these permutators are connected to eight of their own inputs, this eightfold connection being designated in the drawing by a heavy line.

Permutators $p_1$, $p_2$ and $p_3$ are connected to key generator 82 through decoders $k_1$, $k_2$ and $k_3$, each having three binary inputs and eight outputs.

The eight outputs of the-circuits $a_1$ to $h_1$, $a_2$ to $h_2$ and $a_3$ to $h_3$ are respectively connected to OR-circuits $s_1$, $s_2$ and $s_3$.

Once again, all the elements of the circuit of FIG. 6 are well known in the art.

The operation of this system is as follows:

One of the outputs of a decoder, for example decoder $k_1$, being energized, only one of the AND-gates carrying index 1, is operated. The signal applied to this AND-gate appears then at one of the inputs of the OR-gate $s_1$. In the same way, any one of the signals *a* to *h* reaches one of the inputs of gates $s_2$ and $s_3$. Finally, three of the signals *a* to *h* which are not necessarily distinct from each other are applied to gates $s_1$, $s_2$ and $s_3$ in a manner depending on the binary numbers provided by key generator 82.

Of course the invention is not limited to the embodiments described which were given only by way of example and may undergo many modifications without departing from the spirit and scope of the invention. Thus the permutators may be omitted, entirely or in part, or generally speaking, placed at any other suitable place in the circuits.

What is claimed, is:

1. A generator of quasi random symbols comprising in combination: at least one decoder having inputs for receiving binary counts and a plurality of first outputs; at least one permutator having inputs coupled to said first outputs and a plurality of second outputs; a plurality of OR-gates having respective inputs and third outputs, said inputs being coupled to said second outputs; and an encoder arrangement having inputs coupled to said third outputs.

2. A generator of quasi random symbols comprising in combination: $n$ decoders having inputs for receiving binary counts and respective outputs, $n$ being a positive integer; $n$ permutators having inputs and outputs; the outputs of each decoder being respectively coupled to the inputs of a different permutator; $n$ groups of OR-gates of each group being respectively coupled to the outputs of a different permutator; and an encoder arrangement having inputs respectively coupled to at least a part of said OR-gate outputs.

3. A generator of quasi random symbols comprising in combination: $n$ decoders having inputs for receiving binary counts and respective outputs; $n$ permutators having inputs and outputs, $n$ being a positive integer; the outputs of each decoder being respectively coupled to the inputs of a different permutator; $n$ groups of OR-gates having inputs and outputs; the inputs of the OR-gates of each group being respectively coupled to the outputs of a different permutator; an encoder arrangement having inputs, respectively coupled to at least a part of said OR-gate outputs, and outputs; and a count digit reducer system having inputs, respectively coupled to said encoder outputs, and less outputs than inputs.

4. A generator of quasi random symbols comprising in combination a plurality of binary decoders, having inputs for receiving binary counts, and outputs; a plurality of permutators having inputs and outputs, the outputs of the respective decoders being respectively coupled to said inputs of the respective permutators; a plurality of groups of OR-gates having inputs and outputs; said inputs of said respective groups of OR-gates being respectively coupled to said permutator outputs; a plurality of AND-gates having inputs, coupled to said OR-gate outputs; said AND-gates having respective control inputs and outputs; binary counters having inputs, respectively coupled to said outputs of said AND-gates, and outputs; and means for energizing in a predetermined order said control inputs.

5. A generator of quasi random symbols comprising in combination a plurality of binary decoders, having inputs for receiving binary counts, and outputs; a plurality of permutators having inputs and outputs, the outputs of the respective decoders being respectively coupled to said inputs of the respective permutators; a plurality of groups of OR-gates having inputs and outputs; said inputs of said respective groups of OR-gates being respectively coupled to said permutator outputs; a plurality of AND-gates having inputs, coupled to said OR-gate outputs; said AND-gates having respective control inputs and outputs; binary counters having inputs, respectively coupled to said outputs of said AND-gates and outputs; means for energizing in a predetermned order said control inputs; and a count reducer system having inputs, coupled to said last mentioned outputs, and less outputs than inputs.

6. A generator of quasi random symbols comprising in combination: a plurality of binary decoders having inputs for receiving binary counts and outputs; a plurality of permutators having inputs and outputs, the outputs of the respective decoders being respectively coupled to said inputs of the respective permutators; a plurality of groups of OR-gates having inputs and outputs; the inputs of said respective groups of OR-gates being coupled to said permutator outputs; a plurality of AND-gates having inputs coupled to said OR-gate outputs, said AND-gates having respective control inputs and respective outputs; binary counters having inputs, coupled to said outputs of said AND-gates, and outputs; and means for energizing in a timed order said control inputs, said means comprising a clock generating signals in a predetermined timed relationship.

7. A generator of quasi random symbols comprising in combination: a plurality of first counters having respective inputs and outputs; binary decoders having inputs, respectfully coupled to said outputs, and outputs; a plurality of permutators having inputs and outputs, the outputs of the respective decoders being respectively coupled to said inputs of the respective permutators; a plurality of groups of OR-gates having inputs coupled to said permutator outputs; a plurality of AND-gates having inputs coupled to said OR-gate outputs, said AND-gates having respective control inputs and respective outputs; further binary counters having inputs, coupled to said outputs of said AND-gates, and outputs; and means comprising a clock generating signals in a predetermined timed relationship for energizing in said timed relationship said control inputs and said inputs of said first counters.

8. A generator of quasi random symbols comprising in combination: a plurality of binary decoders having inputs for receiving binary counts and outputs; a plurality of permutators having inputs and outputs, the outputs of of the respective decoders being respectively coupled to said inputs of the respective permutators; a plurality of groups or OR-gates having inputs, coupled to said permutator outputs, and outputs; a plurality of AND-gates having inputs coupled to some of OR-gates, outputs, said AND-gates also having respective control inputs and outputs; some outputs of said OR-gates remaining unconnected and the number of the inputs of said OR-gates not being identical for all the OR-gates; binary counters having respective inputs, coupled to said outputs of said AND-gates, and outputs; and means for energizing in a predetermined timed relationship said control inputs, said means comprising a clock generator having a plurality of sections for generating signals in said timed relationship.

9. A generator of quasi random symbols comprising in combination: a plurality of binary decoders having inputs for receiving binary counts and outputs; a plurality of permutators having inputs and outputs, the outputs of the respective decoders being respectively coupled to said inputs of the respective permutators; a plurality of groups of OR-gates having inputs; coupled to said permutator outputs, and outputs; a plurality of AND-gates having inputs coupled to said OR-gate outputs, said AND-gates also having respective control outputs; binary counters having respective inputs, coupled to said outputs of said AND-gates, and outputs; and means for energizing in a predetermined timed relationship said control inputs, said means comprising a clock generator having a plurality of sections for generating signals in said timed relationship.

10. A generator of quasi random symbols comprising in combination: a plurality of first binary counters having inputs; a plurality of decoders having inputs for receiving binary counts from the outputs of said counters; a plurality of permutators having inputs and outputs, the outputs of the respective decoders being respectively coupled to said inputs of the respective permutators; a plurality of groups of OR-gates having inputs and outputs; at least some of said outputs of the respective permutators being respectively coupled to said inputs of said respective groups of OR-gates; a plurality of AND-gates having inputs, at least some of said outputs of said OR-gates being respectively coupled to said inputs of the respective AND-gates, said AND-gates having respective control inputs and respective outputs; further binary counters having respective inputs, coupled to said outputs of said AND-gates and outputs; a clock generator for generating signals in a predetermined timed relationship and connection means for applying said signals respectively to said respective inputs of said first binary counters and to said control inputs.

11. A generator of quasi random symbols comprising in combination: at least one decoder having inputs for receiving binary counts and a plurality of first outputs; at least one permutator having inputs coupled to said first outputs and a plurality of second outputs; a plurality of OR-gates having respective inputs and third outputs, said inputs being coupled to said second outputs; an encoder arrangement having inputs, coupled to said third outputs, and fourth outputs; and a system for reducing the number of binary counts appearing at the said fourth outputs, said system being coupled to said fourth outputs.

12. A generator of quasi random symbols comprising in combination: at least two assemblies connected as a cascade, each assembly comprising a plurality of binary decoders having inputs for receiving binary counts and outputs; a plurality of permutators having inputs and outputs, the outputs of the respective decoders being respectively coupled to said inputs of the respective permutators; a plurality of groups of OR-gates having inputs and outputs, the inputs of said OR-gates being coupled to said permutator outputs; a plurality of AND-gates having inputs, coupled to said OR-gate outputs, respective control inputs and outputs; binary counters having respective inputs, coupled to said outputs of said AND-gates, and outputs; said last mentioned outputs being the respective outputs of said assemblies and being respectively connected to the inputs of said decoders of the following cascade connected assembly, said outputs of said last mentioned counters of the last cascade connected assembly forming the outputs of the whole cascade; a decoder, having inputs coupled to said last mentioned outputs, and outputs; a permutator having inputs respectively, coupled to said last mentioned decoder outputs, and outputs; and an encoder having inputs coupled to said last mentioned permutator outputs.

13. A circuit for reducing the number of output digits of a counter to a lower number, said circuit comprising of *n* inputs and *p* outputs, *n* and *p* being positive integers and *n* being of higher magnitude than *p*, a plurality of AND gates having respective first inputs, second inputs and outputs, said first inputs of said AND gates being coupled to said *n* inputs, a source of binary counts, *p* decoders coupled for decoding said counts, said decoders having *n* respective outputs; *p* permutators having *n* respective inputs, respectively coupled to said *n* outputs of said *p* decoders, and *n* outputs respectively coupled to said second inputs of said AND gates, *p* OR gates having *n* respective inputs and an output, said *n* inputs being coupled to said outputs of said AND gates, and said output of said OR gates being the *p* outputs of said circuit.

14. A generator of quasi random signals comprising in combination: at least one decoder having inputs for receiving binary counts and a plurality of first outputs; at least one permutator having inputs coupled to said first outputs and a plurality of second outputs, a plurality of OR-gates having respective inputs and third outputs, said inputs being coupled to said second outputs; an encoder arrangement having inputs, coupled to said third outputs; said arrangement having *n* outputs; a circuit for reducing the number of *n* to a lower number said circuit comprising: *n* inputs coupled to the outputs of said encoder arrangement; *m* group of *p* AND-gates, having respective first inputs, second inputs and outputs, said first inputs of the AND-gates of each group being coupled to said *n* inputs; a source of counts; *p* decoders coupled for decoding said counts, said decoders having *n* respective outputs; *p* permutators having *n* respective inputs, respectively coupled to said outputs of different decoders and *n* outputs respectively coupled to one of said second inputs in each of said group– *p* OR-gates each having *n* respective inputs and one output, said *n* inputs being coupled to one of the outputs of each of said *n* groups of AND-gates, *n*, *m* and *p* being positive integers.

15. A generator of quasi random symbols comprising in combination: at least one decoder having inputs for receiving binary counts and a plurality of first outputs; a plurality of OR-gates having respective inputs and second outputs, said inputs being coupled to said first outputs; and an encoder arrangement having inputs coupled to said second outputs.

16. A generator of quasi random symbols comprising in combination: at least one decoder having inputs for receiving binary counts and a plurality of first outputs; a plurality of OR-gates having respective inputs and second outputs, said inputs being coupled to said first outputs; an encoder arrangement having inputs coupled to said second outputs; and at least one permutator coupled between one plurality of said outputs and one plurality of said inputs.

17. A generator of quasi random symbols comprising in combination: *n* decoders having inputs for receiving binary counts and respective outputs, *n* being a positive integer; *n* groups of OR-gates having inputs and outputs; the inputs of the OR-gates of each group being respectively coupled to the outputs of a different decoder; and an encoder arrangement having inputs respectively coupled to at least a part of said OR-gate outputs.

18. A generator of quasi random symbols comprising in combination: at least two assemblies connected as a cascade, each assembly comprising a plurality of binary decoders having inputs for receiving binary counts and outputs; a plurality of permutators having inputs and outputs, the outputs of the respective decoders being respectively coupled to said inputs of the respective permutators; a plurality of groups of OR-gates having inputs and outputs, the inputs of said OR-gates being coupled to said permutator outputs; and a plurality of AND-gates having inputs, coupled to said OR-gate outputs, respective control inputs and outputs; binary counters having respective inputs, coupled to said outputs of said AND-gates, and outputs; said last mentioned outputs being the respective outputs of said assemblies and being respectively connected to the inputs of said decoders of the following cascade connected assembly, said outputs of said last mentioned counters of the last cascade connected assembly forming the outputs of the whole cascade.

References Cited by the Examiner

UNITED STATES PATENTS

| | | | |
|---|---|---|---|
| 2,924,658 | 2/1960 | Slayton | 178—22 |
| 3,038,028 | 6/1962 | Henze | 178—22 |
| 3,051,783 | 8/1962 | Hell et al. | 178—22 |
| 3,170,033 | 2/1965 | Vasseur | 178—22 |

FOREIGN PATENTS

| | | |
|---|---|---|
| 714,908 | 9/1964 | Great Britain. |

NEIL C. READ, *Primary Examiner.*

ROBERT H. ROSE, *Examiner.*

A. J. DUNN, T. A. ROBINSON, *Assistant Examiners.*